US012607504B2

(12) United States Patent
Cao et al.

(10) Patent No.: US 12,607,504 B2
(45) Date of Patent: Apr. 21, 2026

(54) METHODS OF OPERATION OF IMAGE SENSOR

(71) Applicant: SHENZHEN XPECTVISION TECHNOLOGY CO., LTD., Guangdong (CN)

(72) Inventors: Peiyan Cao, Guangdong (CN); Yurun Liu, Guangdong (CN)

(73) Assignee: SHENZHEN XPECTVISION TECHNOLOGY CO., LTD., Guangdong (CN)

( * ) Notice: Subject to any disclaimer, the term of this patent is extended or adjusted under 35 U.S.C. 154(b) by 211 days.

(21) Appl. No.: 18/745,937

(22) Filed: Jun. 17, 2024

(65) Prior Publication Data

US 2024/0337531 A1      Oct. 10, 2024

Related U.S. Application Data

(63) Continuation of application No. PCT/CN2022/070037, filed on Jan. 4, 2022.

(51) Int. Cl.
| | |
|---|---|
| *H04N 25/30* | (2023.01) |
| *A61B 6/00* | (2024.01) |
| *A61B 6/42* | (2024.01) |
| *G01J 1/04* | (2006.01) |
| *G01J 1/44* | (2006.01) |
| *G01N 23/04* | (2018.01) |

(52) U.S. Cl.
CPC ................. *G01J 1/44* (2013.01); *G01J 1/044* (2013.01); *H04N 25/30* (2023.01); *G01J 2001/448* (2013.01)

(58) Field of Classification Search
CPC ........ G01J 1/44; G01J 1/044; G01J 2001/448; H04N 25/30; A61B 6/5241; A61B 6/4233; G01N 2223/314; G01N 2223/33; G01N 2223/501; G01N 23/04
See application file for complete search history.

(56) References Cited

U.S. PATENT DOCUMENTS

| | | |
|---|---|---|
| 2003/0095631 A1 | 5/2003 | Rosner |
| 2021/0353964 A1 | 11/2021 | Keller et al. |

FOREIGN PATENT DOCUMENTS

| | | | | |
|---|---|---|---|---|
| CN | 102271585 | 12/2011 | | |
| CN | 112702950 | 4/2021 | | |
| CN | 112702950 A | * | 4/2021 | ............ A61B 6/025 |
| CN | 112888967 | 6/2021 | | |
| CN | 112930485 | 6/2021 | | |
| TW | 201821826 | 6/2018 | | |
| WO | 2021168724 | 9/2021 | | |

* cited by examiner

*Primary Examiner* — Courtney D Thomas
(74) *Attorney, Agent, or Firm* — JC ONE WORLD

(57)      ABSTRACT

Disclosed herein is a method comprising: sending radiation pulses (i), i=1, . . . , M one by one toward an object and toward an image sensor as the image sensor moves nonstop in a first direction with respect to the object; and for each value of i, capturing with the image sensor a partial image (i) of the object using radiation of the radiation pulse (i) that has transmitted through the object. The image sensor comprises N active areas. Each active area of the N active areas comprises multiple sensing elements. For each value of i, the radiation pulse (i) has a pulse duration during which the image sensor travels a distance shorter than a width measured in the first direction of any sensing element of the image sensor. M and N are integers greater than 1.

14 Claims, 8 Drawing Sheets

1000

1010: sending radiation pulses (i), i=1,...,M one by one toward an object and toward an image sensor as the image sensor moves nonstop in a first direction with respect to the object.

1020: for each value of i, capturing with the image sensor a partial image (i) of the object using radiation of the radiation pulse (i) that has transmitted through the object,
    wherein the image sensor comprises N active areas,
    wherein each active area of the N active areas comprises multiple sensing elements,
    wherein for each value of i, the radiation pulse (i) has a pulse duration during which the image sensor travels a distance shorter than a width measured in the first direction of any sensing element of the image sensor, and
    wherein M and N are integers greater than 1.

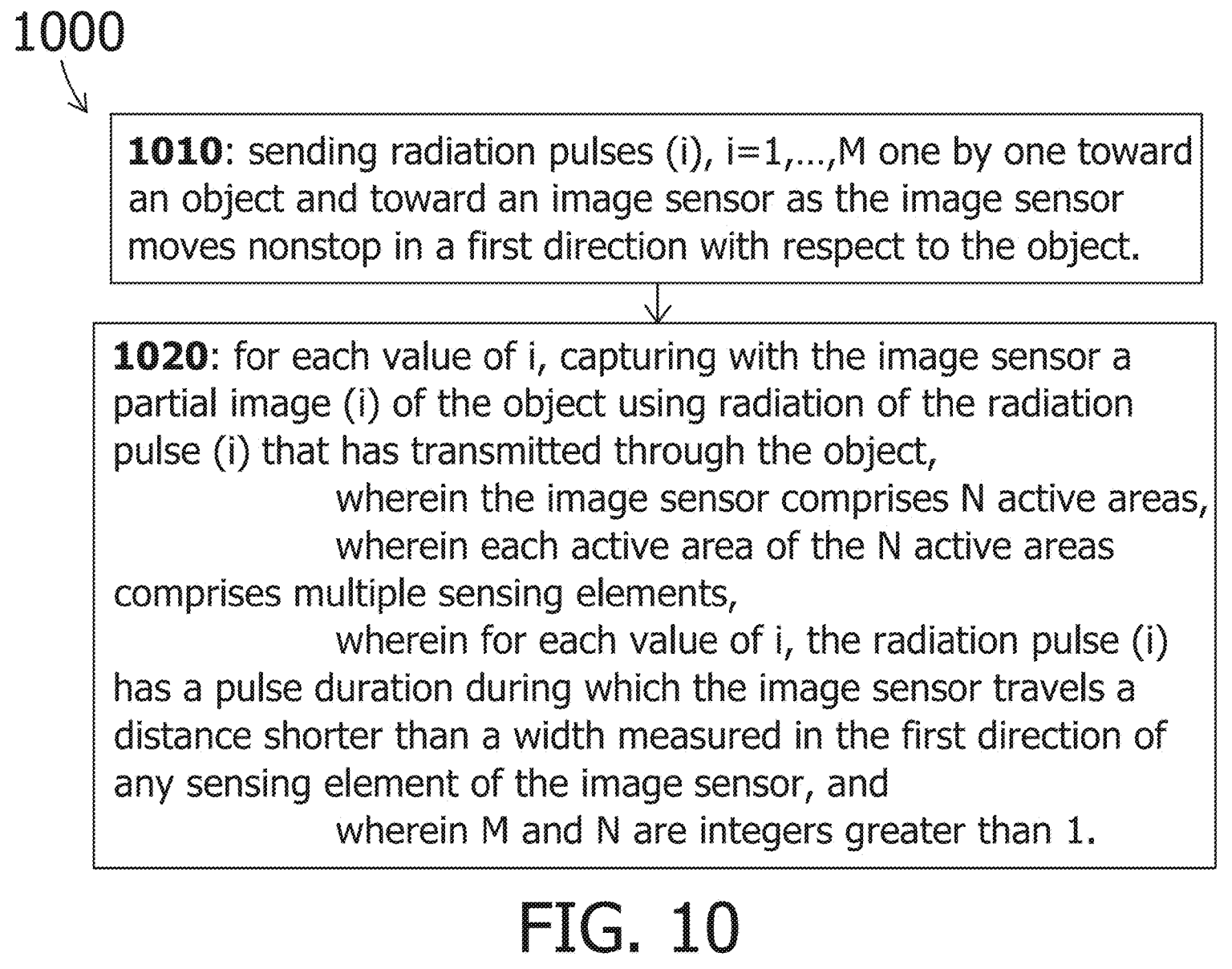

1000

1010: sending radiation pulses (i), i=1,...,M one by one toward an object and toward an image sensor as the image sensor moves nonstop in a first direction with respect to the object.

1020: for each value of i, capturing with the image sensor a partial image (i) of the object using radiation of the radiation pulse (i) that has transmitted through the object, wherein the image sensor comprises N active areas, wherein each active area of the N active areas comprises multiple sensing elements, wherein for each value of i, the radiation pulse (i) has a pulse duration during which the image sensor travels a distance shorter than a width measured in the first direction of any sensing element of the image sensor, and wherein M and N are integers greater than 1.

FIG. 10

METHODS OF OPERATION OF IMAGE SENSOR

CROSS-REFERENCE TO RELATED APPLICATION

This application is a continuation of international PCT application serial no. PCT/CN2022/070037, filed on Jan. 4, 2022. The entirety of the above-mentioned patent application is hereby incorporated by reference and made a part of this specification.

BACKGROUND

A radiation detector is a device that measures a property of a radiation. Examples of the property may include a spatial distribution of the intensity, phase, and polarization of the radiation. The radiation measured by the radiation detector may be a radiation that has transmitted through an object. The radiation measured by the radiation detector may be electromagnetic radiation such as infrared light, visible light, ultraviolet light, X-ray, or y-ray. The radiation may be of other types such as a-rays and B-rays. An imaging system may include one or more image sensors each of which may have one or more radiation detectors.

SUMMARY

Disclosed herein is a method comprising: sending radiation pulses (i), i=1, . . . , M one by one toward an object and toward an image sensor as the image sensor moves nonstop in a first direction with respect to the object; and for each value of i, capturing with the image sensor a partial image (i) of the object using radiation of the radiation pulse (i) that has transmitted through the object. The image sensor comprises N active areas. Each active area of the N active areas comprises multiple sensing elements. For each value of i, the radiation pulse (i) has a pulse duration during which the image sensor travels a distance shorter than a width measured in the first direction of any sensing element of the image sensor. M and N are integers greater than 1.

In an aspect, said sending the radiation pulses (i), i=1, . . . , M comprises: sending a radiation beam to a shutter; and opening and closing the shutter to create each radiation pulse of the radiation pulses (i), i=1, . . . , M from the radiation beam.

In an aspect, each radiation pulse of the radiation pulses (i), i=1, . . . , M comprises X-rays.

In an aspect, the N active areas comprise P active area rows, P being an integer greater than 1, each active area row of the P active area rows comprises multiple active areas of the N active areas, and for each active area row of the P active area rows, a straight line parallel to the first direction intersects all active areas of said each active area row.

In an aspect, any two adjacent active areas of any active area row of the P active area rows overlap each other with respect to the radiation pulses (i), i=1, . . . , M.

In an aspect, said any two adjacent active areas are respectively in two different wafer layers.

In an aspect, the image sensor further comprises a column gap between any two adjacent active areas of any active area row of the P active area rows, and said column gap is along a second direction perpendicular to the first direction.

In an aspect, for a time span between any two adjacent radiation pulses of the radiation pulses (i), i=1, . . . , M, a distance traveled along the first direction by the image sensor during said time span is greater than a width of any column gap of the image sensor.

In an aspect, the P active area rows are respectively on P row PCBs (printed circuit boards), and the P row PCBs are on a system PCB.

In an aspect, for each active area row of the P active area rows, portions of the partial images (i), i=1, . . . , M captured by said each active area row when stitched together form a continuous image stripe.

In an aspect, the image sensor further comprises P row input/output areas respectively for the P active area rows. The P row input/output areas and the P active area rows are arranged in an alternating manner.

In an aspect, the method further comprises: after said capturing the partial images (i), i=1, . . . , M is performed, moving the image sensor in a third direction perpendicular to the first direction; and then capturing with the image sensor additional partial images of the object one by one as the image sensor moves nonstop with respect to the object in a fourth direction parallel to the first direction.

In an aspect, the image sensor further comprises a row gap between any two adjacent active area rows of the P active area rows. Said movement of the image sensor in the third direction covers a distance greater than a width of any row gap of the image sensor.

In an aspect, each point of the object is in at least a partial image of the partial images (i), i=1, . . . , M and the additional partial images.

BRIEF DESCRIPTION OF FIGURES

FIG. 10 shows a flowchart generalizing the operation of the imaging system, according to an embodiment.

DETAILED DESCRIPTION

Radiation Detector

Figure 1:
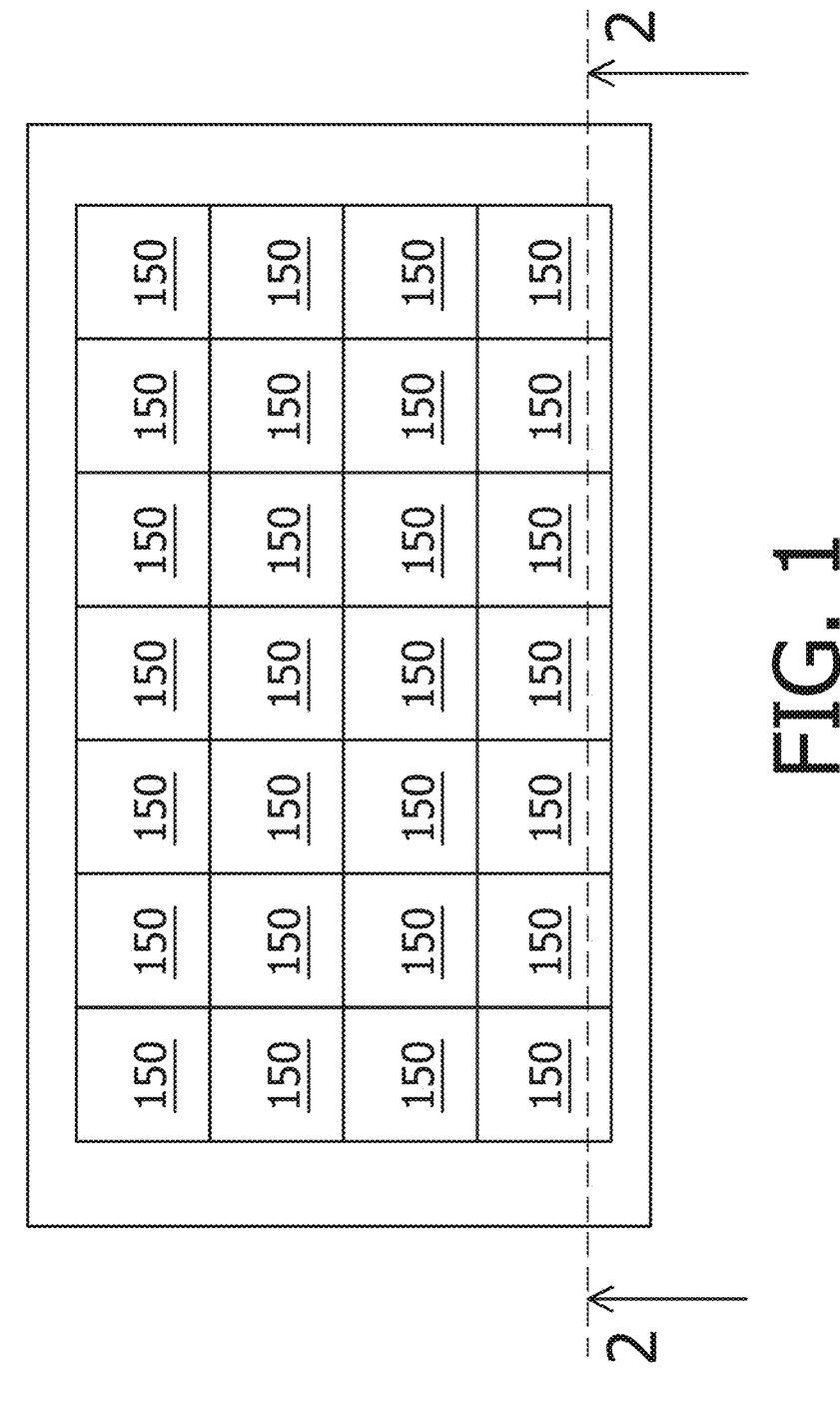
FIG. 1 schematically shows a radiation detector, according to an embodiment.

FIG. 1 schematically shows a radiation detector 100, as an example. The radiation detector 100 may include an array of pixels 150 (also referred to as sensing elements 150). The array may be a rectangular array (as shown in FIG. 1), a honeycomb array, a hexagonal array, or any other suitable array. The array of pixels 150 in the example of FIG. 1 has 4 rows and 7 columns; however, in general, the array of pixels 150 may have any number of rows and any number of columns.

Each pixel 150 may be configured to detect radiation from a radiation source (not shown) incident thereon and may be configured to measure a characteristic (e.g., the energy of the particles, the wavelength, and the frequency) of the radiation. A radiation may include particles such as photons and subatomic particles. Each pixel 150 may be configured to count numbers of particles of radiation incident thereon whose energy falls in a plurality of bins of energy, within a period of time. All the pixels 150 may be configured to count the numbers of particles of radiation incident thereon within a plurality of bins of energy within the same period of time. When the incident particles of radiation have similar energy, the pixels 150 may be simply configured to count numbers of particles of radiation incident thereon within a period of time, without measuring the energy of the individual particles of radiation.

Each pixel 150 may have its own analog-to-digital converter (ADC) configured to digitize an analog signal representing the energy of an incident particle of radiation into a digital signal, or to digitize an analog signal representing the total energy of a plurality of incident particles of radiation into a digital signal. The pixels 150 may be configured to operate in parallel. For example, when one pixel 150 measures an incident particle of radiation, another pixel 150 may be waiting for a particle of radiation to arrive. The pixels 150 may not have to be individually addressable.

The radiation detector 100 described here may have applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this radiation detector 100 in place of a photographic plate, a photographic film, a PSP plate, an X-ray image intensifier, a scintillator, or another semiconductor X-ray detector.

Figure 2:
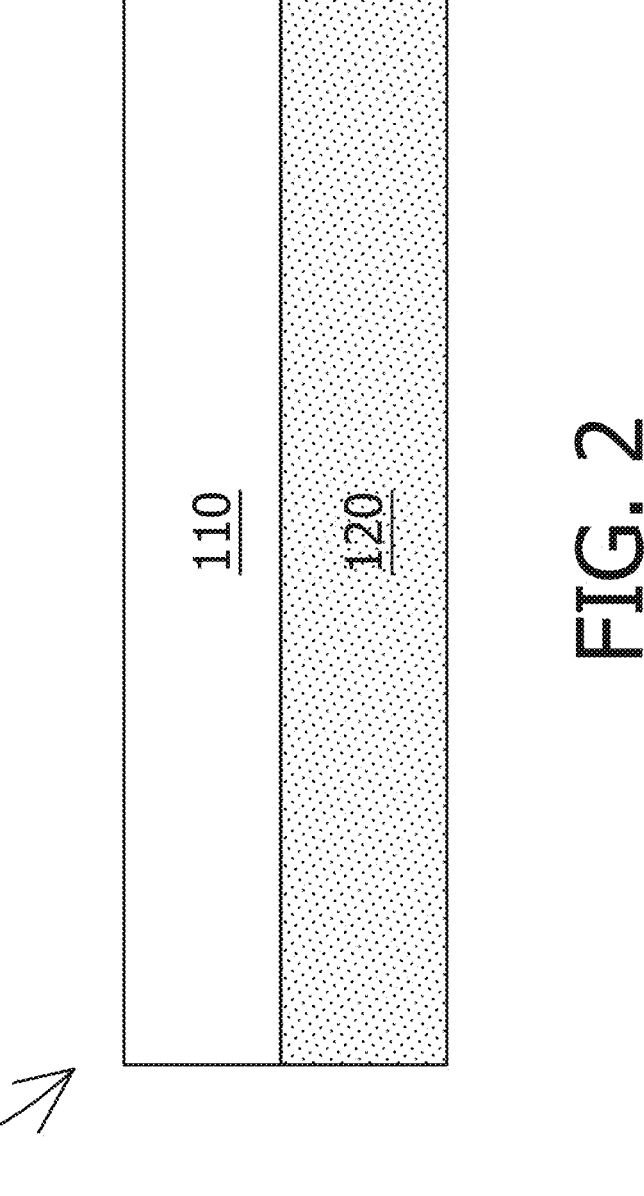
FIG. 2 schematically shows a simplified cross-sectional view of the radiation detector, according to an embodiment.

FIG. 2 schematically shows a simplified cross-sectional view of the radiation detector 100 of FIG. 1 along a line 2-2, according to an embodiment. Specifically, the radiation detector 100 may include a radiation absorption layer 110 and an electronics layer 120 (which may include one or more ASICs or application-specific integrated circuits) for processing or analyzing electrical signals which incident radiation generates in the radiation absorption layer 110. The radiation detector 100 may or may not include a scintillator (not shown). The radiation absorption layer 110 may include a semiconductor material such as silicon, germanium, GaAs, CdTe, CdZnTe, or a combination thereof. The semiconductor material may have a high mass attenuation coefficient for the radiation of interest.

Figure 3:
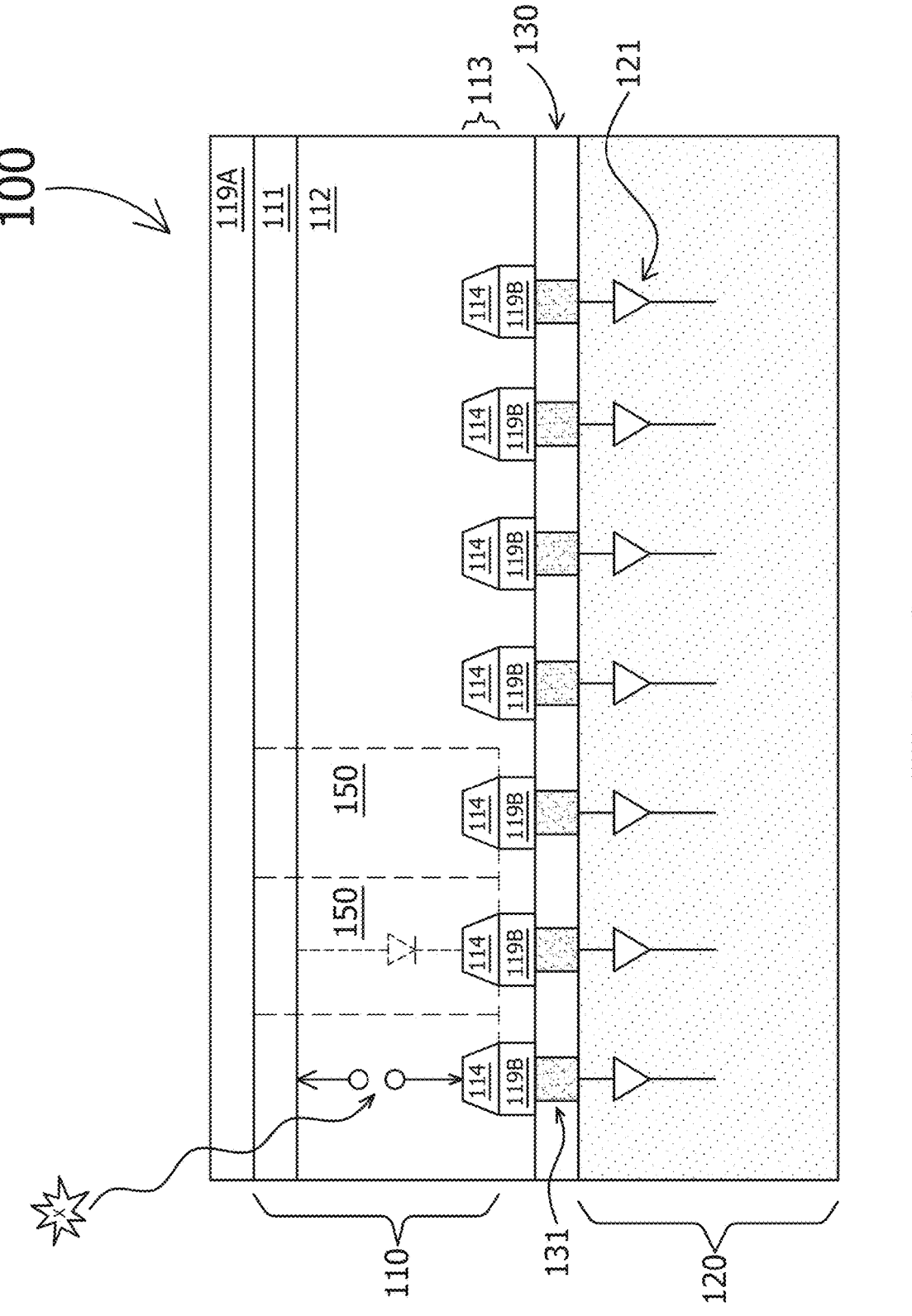
FIG. 3 schematically shows a detailed cross-sectional view of the radiation detector, according to an embodiment.

FIG. 3 schematically shows a detailed cross-sectional view of the radiation detector 100 of FIG. 1 along the line 2-2, as an example. Specifically, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112. The discrete regions 114 may be separated from one another by the first doped region 111 or the intrinsic region 112. The first doped region 111 and the second doped region 113 may have opposite types of doping (e.g., region 111 is p-type and region 113 is n-type, or region 111 is n-type and region 113 is p-type). In the example of FIG. 3, each of the discrete regions 114 of the second doped region 113 forms a diode with the first doped region 111 and the optional intrinsic region 112. Namely, in the example in FIG. 3, the radiation absorption layer 110 has a plurality of diodes (more specifically, 7 diodes corresponding to 7 pixels 150 of one row in the array of FIG. 1, of which only 2 pixels 150 are labeled in FIG. 3 for simplicity). The plurality of diodes may have an electrical contact 119A as a shared (common) electrode. The first doped region 111 may also have discrete portions.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs (analog to digital converters). The electronic system 121 may include components shared by the pixels 150 or components dedicated to a single pixel 150. For example, the electronic system 121 may include an amplifier dedicated to each pixel 150 and a microprocessor shared among all the pixels 150. The electronic system 121 may be electrically connected to the pixels 150 by vias 131. Space among the vias may be filled with a filler material 130, which may increase the mechanical stability of the connection of the electronics layer 120 to the radiation absorption layer 110. Other bonding techniques are possible to connect the electronic system 121 to the pixels 150 without using the vias 131.

When radiation from the radiation source (not shown) hits the radiation absorption layer 110 including diodes, particles of the radiation may be absorbed and generate one or more charge carriers (e.g., electrons, holes) by a number of mechanisms. The charge carriers may drift to the electrodes of one of the diodes under an electric field. The electric field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel 150.

Figure 4:
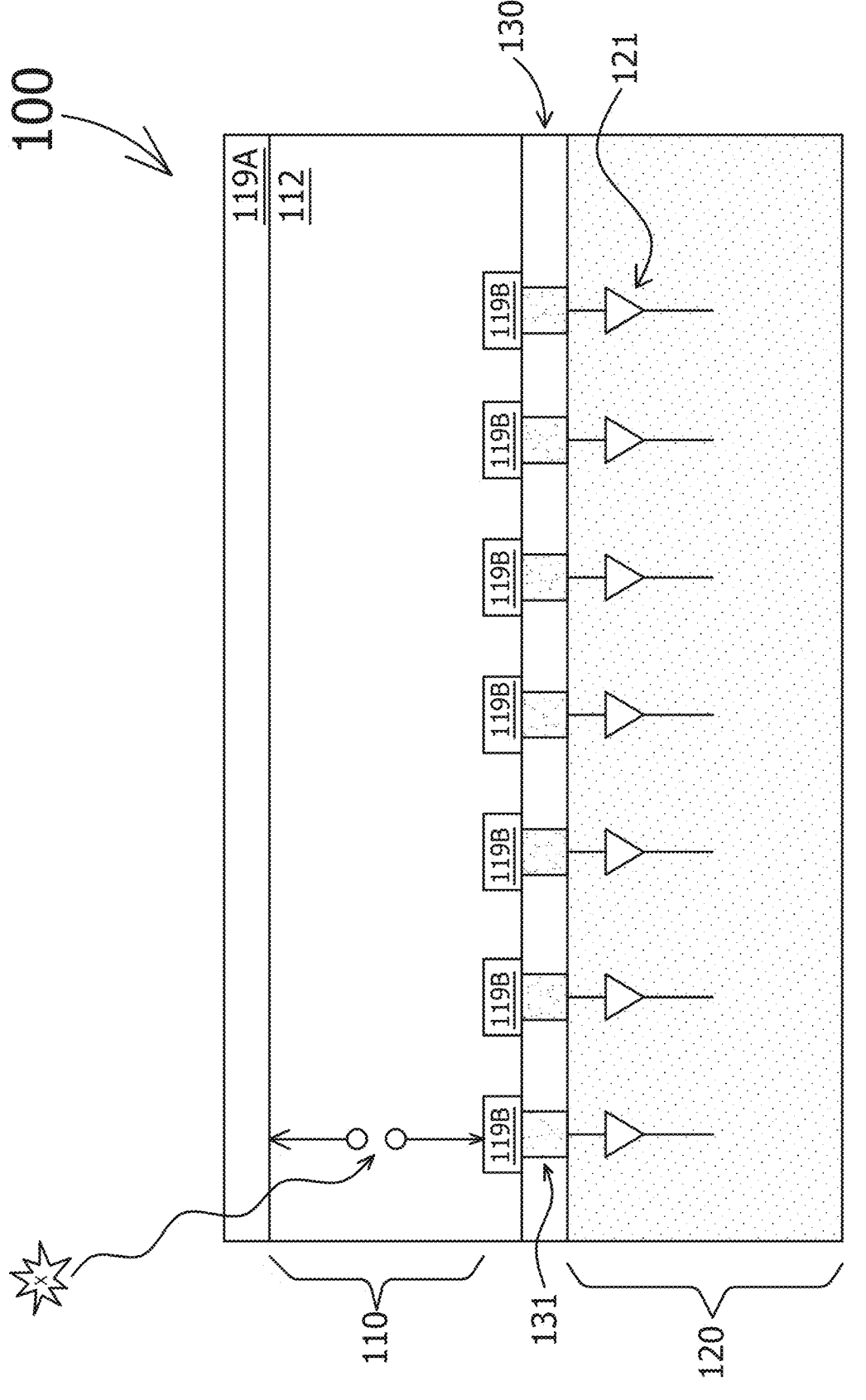
FIG. 4 schematically shows a detailed cross-sectional view of the radiation detector, according to an alternative embodiment.

FIG. 4 schematically shows a detailed cross-sectional view of the radiation detector 100 of FIG. 1 along the line 2-2, according to an alternative embodiment. More specifically, the radiation absorption layer 110 may include a resistor of a semiconductor material such as silicon, germanium, GaAs, CdTe, CdZnTe, or a combination thereof, but does not include a diode. The semiconductor material may have a high mass attenuation coefficient for the radiation of interest. In an embodiment, the electronics layer 120 of FIG. 4 is similar to the electronics layer 120 of FIG. 3 in terms of structure and function.

When the radiation hits the radiation absorption layer 110 including the resistor but not diodes, it may be absorbed and generate one or more charge carriers by a number of mechanisms. A particle of the radiation may generate 10 to 100,000 charge carriers. The charge carriers may drift to the electrical contacts 119A and 119B under an electric field. The electric field may be an external electric field. The electrical contact 119B may include discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

Radiation Detector Package

Figures 5, 6:
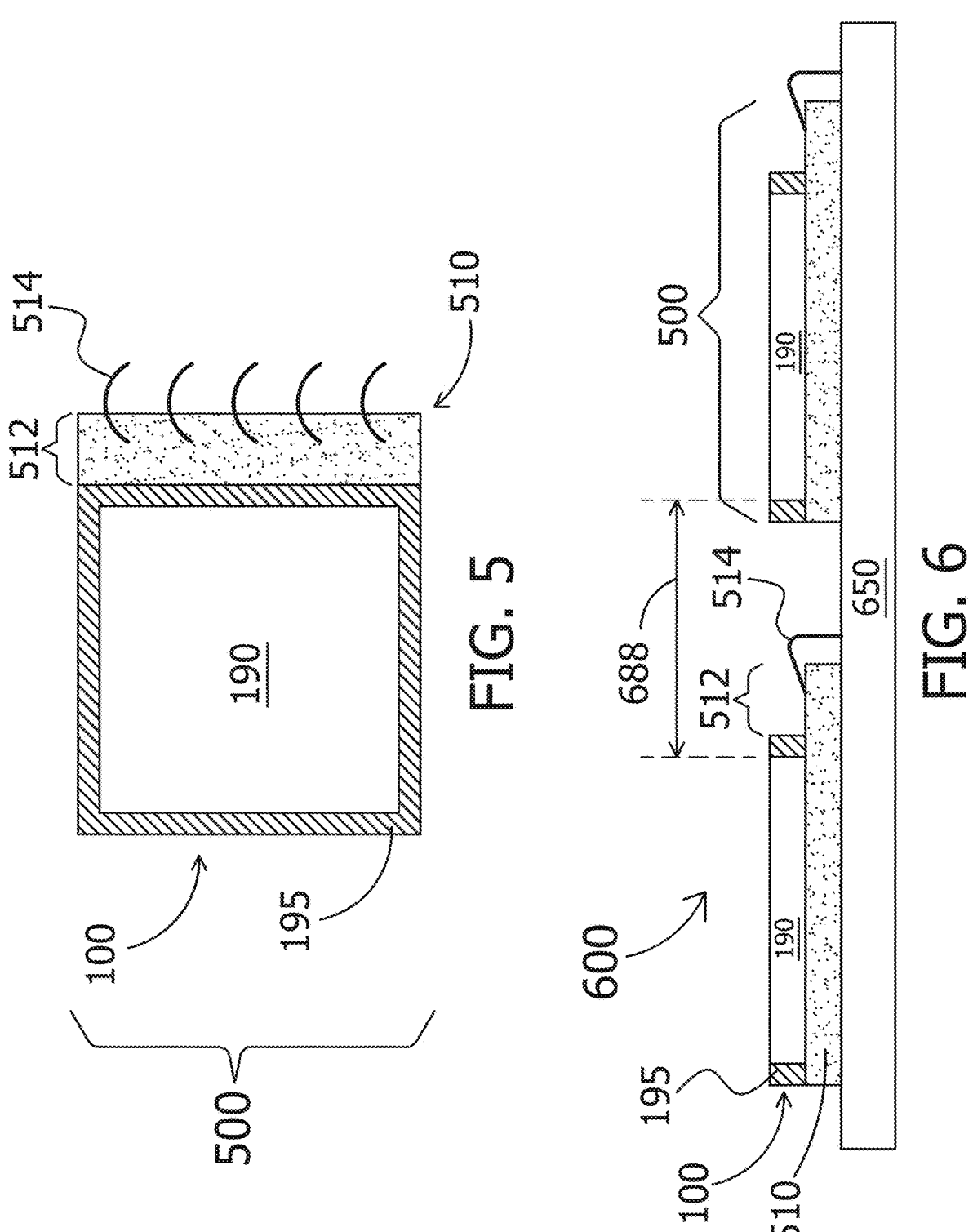
FIG. 5 schematically shows a top view of a radiation detector package including the radiation detector and a printed circuit board (PCB), according to an embodiment.
FIG. 6 schematically shows a cross-sectional view of an image sensor including the packages of FIG. 5 mounted to a system PCB (printed circuit board), according to an embodiment.

FIG. 5 schematically shows a top view of a radiation detector package 500 including the radiation detector 100 and a printed circuit board (PCB) 510. The term "PCB" as used herein is not limited to a particular material. For example, a PCB may include a semiconductor. The radiation detector 100 may be mounted to the PCB 510. The wiring between the radiation detector 100 and the PCB 510 is not shown for the sake of clarity. The package 500 may have one or more radiation detectors 100. The PCB 510 may include an input/output (I/O) area 512 not covered by the radiation detector 100 (e.g., for accommodating bonding wires 514). The radiation detector 100 may have an active area 190 which is where the pixels 150 (FIG. 1) are located. The radiation detector 100 may have a perimeter zone 195 near the edges of the radiation detector 100. The perimeter zone 195 has no pixels 150, and the radiation detector 100 does not detect particles of radiation incident on the perimeter zone 195.

Image Sensor

FIG. 6 schematically shows a cross-sectional view of an image sensor 600, according to an embodiment. The image sensor 600 may include one or more radiation detector packages 500 of FIG. 5 mounted to a system PCB 650. The electrical connection between the PCBs 510 and the system PCB 650 may be made by bonding wires 514. In order to accommodate the bonding wires 514 on the PCB 510, the PCB 510 may have the I/O area 512 not covered by the radiation detectors 100. In order to accommodate the bonding wires 514 on the system PCB 650, the packages 500 may have gaps in between. The gaps may be approximately 1 mm or more. Particles of radiation incident on the perimeter zones 195, on the I/O area 512, or on the gaps cannot be detected by the packages 500 on the system PCB 650. A dead zone of a radiation detector (e.g., the radiation detector

100) is the area of the radiation-receiving surface of the radiation detector, on which incident particles of radiation cannot be detected by the radiation detector. A dead zone of a package (e.g., package 500) is the area of the radiation-receiving surface of the package, on which incident particles of radiation cannot be detected by the radiation detector or detectors in the package. In this example shown in FIG. 5 and FIG. 6, the dead zone of the package 500 includes the perimeter zones 195 and the I/O area 512. A dead zone (e.g., 688) of an image sensor (e.g., image sensor 600) with a group of packages (e.g., packages 500 mounted on the same PCB and arranged in the same layer or in different layers) includes the combination of the dead zones of the packages in the group and the gaps between the packages.

In an embodiment, the radiation detector 100 (FIG. 1) operating by itself may be considered an image sensor. In an embodiment, the package 500 (FIG. 5) operating by itself may be considered an image sensor.

The image sensor 600 including the radiation detectors 100 may have the dead zone 688 among the active areas 190 of the radiation detectors 100. However, the image sensor 600 may capture multiple partial images of an object or scene (not shown) one by one, and then these captured partial images may be stitched to form a stitched image of the entire object or scene.

The term "image" in the present specification is not limited to spatial distribution of a property of a radiation (such as intensity). For example, the term "image" may also include the spatial distribution of density of a substance or element.

Figures 7, 8, 9:
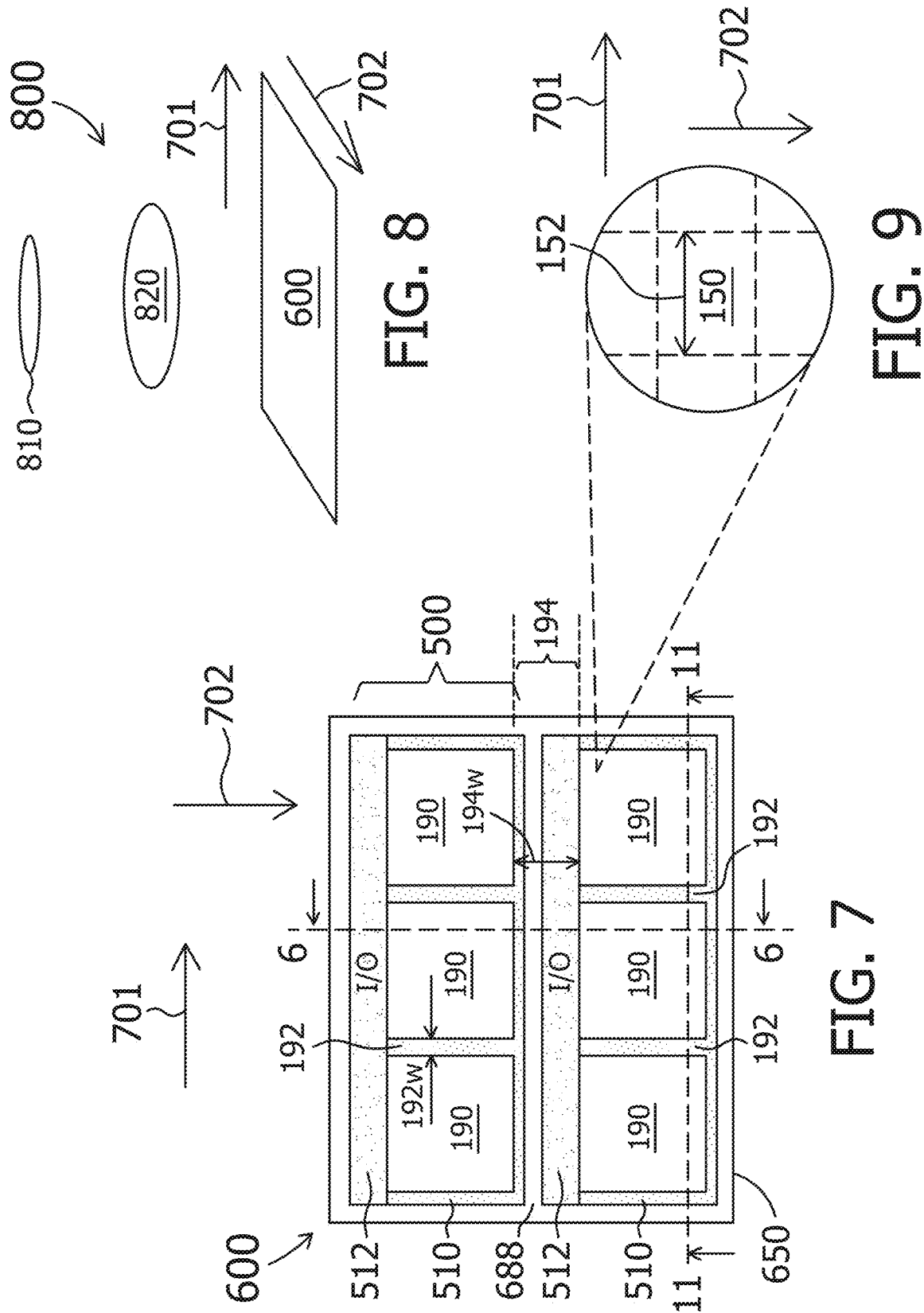
FIG. 7 schematically shows a top view of the image sensor of FIG. 6, according to an embodiment.
FIG. 8 schematically shows a perspective view of an imaging system including the image sensor, according to an embodiment.
FIG. 9 schematically shows a detailed view of some sensing elements of the image sensor of FIG. 7, according to an embodiment.

FIG. 7 schematically shows a top view of the image sensor 600 of FIG. 6, according to an embodiment. Note that FIG. 6 schematically shows a cross-sectional view of the image sensor 600 of FIG. 7 along a line 6-6, according to an embodiment. However, in FIG. 7, for simplicity, the perimeter zones 195 are not shown.

Imaging System and Operation

FIG. 8 schematically shows a perspective view of an imaging system 800, according to an embodiment. In an embodiment, the imaging system 800 may include a radiation source 810 and the image sensor 600. In an embodiment, an object 820 may be positioned between the radiation source 810 and the image sensor 600.

In an embodiment, the imaging system 800 may operate as follows. With reference to FIG. 7-FIG. 8, the radiation source 810 may send first radiation pulses one by one toward the object 820 and toward the image sensor 600 as the image sensor 600 moves nonstop (i.e., without stopping) with respect to the object 820 in a direction 701.

In an embodiment, for each radiation pulse of the first radiation pulses, the image sensor 600 may capture a partial image of the object 820 using the radiation of said each radiation pulse that has transmitted through the object 820. These captured partial images of the object 820 may be referred to as the first partial images.

In an embodiment, for each radiation pulse of the first radiation pulses, during the pulse duration of said each radiation pulse, the image sensor 600 may travel a distance shorter than a width 152 (FIG. 9) measured in the direction 701 of any sensing element 150 of the image sensor 600. Note that FIG. 9 shows a detailed view of some sensing elements 150 of the image sensor 600 of FIG. 7. Note also that during the pulse duration of said each radiation pulse, the radiation source 810 sends radiation to the object 820 and the image sensor 600.

FIG. 10 shows a flowchart 1000 generalizing the operation of the imaging system 800 of FIG. 8. In step 1010, radiation pulses (i), i=1, . . . , M are sent one by one toward an object and toward an image sensor as the image sensor moves nonstop in a first direction with respect to the object. For example, in the embodiments described above, with reference to FIG. 8, the first radiation pulses are sent one by one toward the object 820 and toward the image sensor 600 as the image sensor 600 moves nonstop (i.e., without stopping) with respect to the object 820 in the direction 701.

In step 1020, for each value of i, the image sensor captures a partial image (i) of the object using radiation of the radiation pulse (i) that has transmitted through the object. For example, in the embodiments described above, with reference to FIG. 8, for each radiation pulse of the first radiation pulses, the image sensor 600 captures a partial image of the object 820 using the radiation of said each radiation pulse that has transmitted through the object 820.

In addition, in step 1020, the image sensor comprises N active areas, and each active area of the N active areas comprises multiple sensing elements. For example, in the embodiments described above, with reference to FIG. 7, the image sensor 600 includes 6 active areas 190, and each of the 6 active areas 190 includes multiple sensing elements 150.

In addition, in step 1020, for each value of i, the radiation pulse (i) has a pulse duration during which the image sensor travels a distance shorter than a width measured in the first direction of any sensing element of the image sensor. For example, in the embodiments described above, with reference to FIG. 7-FIG. 9, for each radiation pulse of the first radiation pulses, during the pulse duration of said each radiation pulse, the image sensor 600 travels a distance shorter than a width 152 (FIG. 9) measured in the direction 701 of any sensing element 150 of the image sensor 600.

Other Embodiments

Using a Shutter to Create Radiation Pulses

In an embodiment, with reference to FIG. 8, the first radiation pulses described above may be created as follows. The radiation source 810 may send a radiation beam toward a shutter (not shown) positioned between the radiation source 810 and the object 820; and the shutter may be opened and then closed to create each radiation pulse of the first radiation pulses from the radiation beam. In an embodiment, each of the first radiation pulses may include X-rays.

Image Sensor Moves Along Active Area Rows

In an embodiment, with reference to FIG. 6-FIG. 7, the image sensor 600 may have 2 radiation detector packages 500 each of which may have 3 active areas 190. In general, the image sensor 600 may have multiple radiation detector packages 500 each of which may have multiple active areas 190. The 6 active areas 190 of the image sensor 600 may be arranged in 2 active area rows each of which has 3 active areas 190 as shown.

In an embodiment, the 2 active area rows may be respectively on the 2 row PCBs 510. In an embodiment, the 2 row PCBs 510 may be on the system PCB 650.

In an embodiment, the direction 701 in which the image sensor 600 moves as it captures the first partial images may be parallel to the active area rows of the image sensor 600. In other words, for each active area row of the 2 active area rows of the image sensor 600, a straight line parallel to the direction 701 intersects all the 3 active areas 190 of said each active area row.

Column Gaps Between Active Areas

In an embodiment, with reference to FIG. 7, the image sensor 600 may include a column gap 192 between any 2 adjacent active areas 190 of any active area row of the 2 active area rows of the image sensor 600. In an embodiment, each of the column gaps 192 of the image sensor 600 may be along a direction 702 perpendicular to the direction 701.

In an embodiment, with reference to FIG. 7, for a time span between any two adjacent radiation pulses of the first radiation pulses, the distance traveled along the direction 701 by the image sensor 600 during that time span may be greater than a width $192w$ of any column gap 192 of the image sensor 600. Note that said time span is an off period during which the radiation source 810 (FIG. 8) does not send any radiation toward the object 820 and the image sensor 600.

Each Active Area Row Scans a Continuous Image Stripe

In an embodiment, with reference to FIG. 7-FIG. 8, the image sensor 600 may capture the first partial images such that, for each active area row of the 2 active area rows of the image sensor 600, the portions of the first partial images captured by said each active area row when stitched together form a continuous image stripe.

More about Row Input/Output (I/O) Areas

In an embodiment, with reference to FIG. 7, the image sensor 600 includes the 2 row I/O areas 512 respectively for the 2 active area rows. In an embodiment, the 2 row I/O areas 512 and the 2 active area rows may be arranged in an alternating manner as shown.

Capturing More Partial Images of the Object

In an embodiment, with reference to FIG. 7 and FIG. 8, after the image sensor 600 captures the first partial images, the image sensor 600 may move in the direction 702 perpendicular to the direction 701. In an embodiment, this movement of the image sensor 600 in the direction 702 may cover a distance greater than a width $194w$ of any row gap 194 between any 2 adjacent active area rows of the image sensor 600.

In an embodiment, after the image sensor 600 moves in the direction 702 as described above, the radiation source 810 may send second radiation pulses one by one toward the object 820 and toward the image sensor 600 as the image sensor 600 moves nonstop (i.e., without stopping) with respect to the object 820 in a direction parallel and opposite to the direction 701.

In an embodiment, for each radiation pulse of the second radiation pulses, the image sensor 600 may capture a partial image of the object 820 using the radiation of said each radiation pulse that has transmitted through the object 820. These captured partial images of the object 820 may be referred to as the second partial images.

Image Sensor Makes More Scanning Passes

In the embodiments described above, the image sensor 600 makes 2 scanning passes. The first scanning pass corresponds to the first radiation pulses and results in the first partial images. The second scanning pass corresponds to the second radiation pulses and results in the second partial images.

In an embodiment, after the image sensor 600 makes the first and second scanning passes, the image sensor 600 may make additional scanning passes similar to the first and second scanning passes so as to scan the entire object 820.

Object is Entirely Scanned

In an embodiment, the capturing of all the partial images described above may scan the entire object 820. In other words, each point of the object 820 may be in at least one of the partial images captured by the image sensor 600. In an embodiment, each point of the object 820 may be in at least a partial image of the first and second partial images described above.

In an embodiment, all the partial images of the object 820 captured by the image sensor 600 may be stitched to create a stitched image of the object 820. In an embodiment, the stitching of the partial images may be performed by the image sensor 600.

Alternative Embodiments

Active Areas in Each Row Overlap Each Other

In the embodiments described above, with reference to FIG. 7, there is a column gap 192 between any 2 adjacent active areas 190 of any active area row of the 2 active area rows of the image sensor 600. In an alternative embodiment, any 2 adjacent active areas 190 of any active area row of the 2 active area rows of the image sensor 600 overlap each other with respect to the first radiation pulses. In other words, for said any 2 adjacent active areas 190 and for any radiation pulse of the first radiation pulses, there is a radiation ray of said any radiation pulse that intersects both said any 2 adjacent active areas 190.

Figure 11:
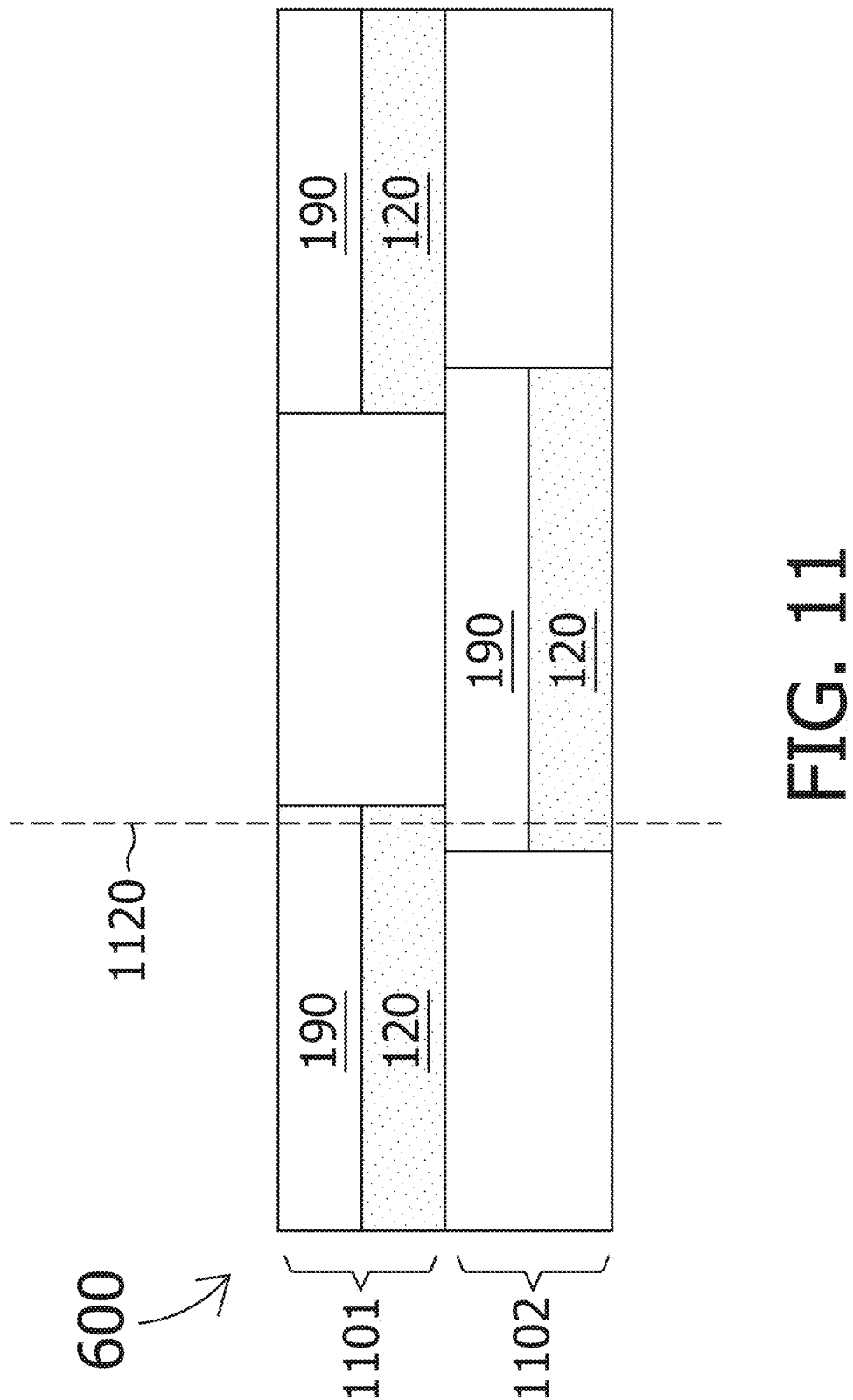
FIG. 11 shows a cross-sectional view of the image sensor of FIG. 7, according to an alternative embodiment.

For example, with reference to FIG. 11 (which shows a cross-sectional view of the image sensor 600 of FIG. 7 along a line 11-11 in case of the alternative embodiment described above), the 2 left active areas 190 (which are adjacent) overlap each other with respect to the first radiation pulses if for any radiation pulse of the first radiation pulses, there is a radiation ray (e.g., the radiation ray 1120) of said any radiation pulse that intersects both the 2 left active areas 190 as shown.

In an embodiment, with reference to FIG. 11, the 2 left active areas 190 mentioned above may be respectively in two different wafer layers 1101 and 1102. In an embodiment, the fabrication of the image sensor 600 may be as follows. The components of the image sensor 600 may be formed on the two separate wafer layers 1101 and 1102, and then the two wafer layers 1101 and 1102 may be bonded together resulting in the image sensor 600 of FIG. 11.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operation of image sensor, comprising:
   sending radiation pulses (i), i=1, . . . , M one by one toward an object and toward the image sensor as the image sensor moves nonstop in a first direction with respect to the object; and
   for each value of i, capturing with the image sensor a partial image (i) of the object using radiation of the radiation pulse (i) that has transmitted through the object,
   wherein the image sensor comprises N active areas,
   wherein each active area of the N active areas comprises multiple sensing elements,
   wherein for each value of i, the radiation pulse (i) has a pulse duration during which the image sensor travels a distance shorter than a width measured in the first direction of any sensing element of the image sensor, and
   wherein M and N are integers greater than 1.

2. The method of operation of image sensor of claim 1, wherein said sending the radiation pulses (i), i=1, . . . , M comprises:
   sending a radiation beam to a shutter; and
   opening and closing the shutter to create each radiation pulse of the radiation pulses (i), i=1, . . . , M from the radiation beam.

3. The method of operation of image sensor of claim 1, wherein each radiation pulse of the radiation pulses (i), i=1, . . . , M comprises X-rays.

4. The method of operation of image sensor of claim 1, wherein the N active areas comprise P active area rows, P being an integer greater than 1,
   wherein each active area row of the P active area rows comprises multiple active areas of the N active areas, and
   wherein for each active area row of the P active area rows, a straight line parallel to the first direction intersects all active areas of said each active area row.

5. The method of operation of image sensor of claim 4, wherein any two adjacent active areas of any active area row of the P active area rows overlap each other with respect to the radiation pulses (i), i=1, . . . , M.

6. The method of operation of image sensor of claim 5, wherein said any two adjacent active areas are respectively in two different wafer layers.

7. The method of operation of image sensor of claim 4, wherein the image sensor further comprises a column gap between any two adjacent active areas of any active area row of the P active area rows, and
   wherein said column gap is along a second direction perpendicular to the first direction.

8. The method of operation of image sensor of claim 7, wherein for a time span between any two adjacent radiation pulses of the radiation pulses (i), i=1, . . . , M, a distance traveled along the first direction by the image sensor during said time span is greater than a width of any column gap of the image sensor.

9. The method of operation of image sensor of claim 4, wherein the P active area rows are respectively on P row PCBs (printed circuit boards), and
   wherein the P row PCBs are on a system PCB.

10. The method of operation of image sensor of claim 4, wherein for each active area row of the P active area rows, portions of the partial images (i), i=1, . . . , M captured by said each active area row when stitched together form a continuous image stripe.

11. The method of operation of image sensor of claim 4, wherein the image sensor further comprises P row input/output areas respectively for the P active area rows, and
   wherein the P row input/output areas and the P active area rows are arranged in an alternating manner.

12. The method of operation of image sensor of claim 4, further comprising:
   after said capturing the partial images (i), i=1, . . . , M is performed, moving the image sensor in a third direction perpendicular to the first direction; and then
   capturing with the image sensor additional partial images of the object one by one as the image sensor moves nonstop with respect to the object in a fourth direction parallel to the first direction.

13. The method of operation of image sensor of claim 12, wherein the image sensor further comprises a row gap between any two adjacent active area rows of the P active area rows, and wherein said movement of the image sensor in the third direction covers a distance greater than a width of any row gap of the image sensor.

14. The method of operation of image sensor of claim 12, wherein each point of the object is in at least a partial image of the partial images (i), i=1, . . . , M and the additional partial images.

* * * * *